(12) United States Patent
Shimokawa et al.

(10) Patent No.: US 9,494,325 B2
(45) Date of Patent: Nov. 15, 2016

(54) FUEL TANK STRUCTURE

(71) Applicants: Shinji Shimokawa, Seto (JP); Nobuharu Mutou, Kitakatsushika-gun (JP); Yasuo Akimoto, Koga (JP)

(72) Inventors: Shinji Shimokawa, Seto (JP); Nobuharu Mutou, Kitakatsushika-gun (JP); Yasuo Akimoto, Koga (JP)

(73) Assignees: TOYOTA JIDOSHA KABUSHIKI KAISHA, Toyota (JP); KYOSAN DENKI CO., LTD., Koga (JP)

( * ) Notice: Subject to any disclaimer, the term of this patent is extended or adjusted under 35 U.S.C. 154(b) by 283 days.

(21) Appl. No.: 14/178,758

(22) Filed: Feb. 12, 2014

(65) Prior Publication Data

US 2014/0230920 A1    Aug. 21, 2014

(30) Foreign Application Priority Data

Feb. 19, 2013   (JP) .................................. 2013-030393

(51) Int. Cl.
| | |
|---|---|
| *F24D 19/08* | (2006.01) |
| *F02M 37/00* | (2006.01) |
| *F02M 25/08* | (2006.01) |
| *B60K 15/035* | (2006.01) |
| *F02M 37/10* | (2006.01) |

(52) U.S. Cl.
CPC ....... *F24D 19/083* (2013.01); *B60K 15/03504* (2013.01); *B60K 15/03519* (2013.01); *F02M 25/0836* (2013.01); *F02M 37/0082* (2013.01); *B60K 2015/03514* (2013.01); *B60K 2015/03561* (2013.01); *B60K 2015/03585* (2013.01); *F02M 37/106* (2013.01); *Y10T 137/3084* (2015.04)

(58) Field of Classification Search
CPC ................... F02M 25/0836; B60K 15/03519; B60K 15/03504
USPC ......... 137/43, 202, 587, 588, 41, 42, 101.27
See application file for complete search history.

(56) References Cited

U.S. PATENT DOCUMENTS

| | | | |
|---|---|---|---|
| 7,267,113 B2 * | 9/2007 | Tsuge ................. | F02M 25/0836 123/520 |
| 2006/0213555 A1 * | 9/2006 | Miura ................... | F16K 24/044 137/202 |

FOREIGN PATENT DOCUMENTS

| | | |
|---|---|---|
| JP | 2010105468 A | 5/2010 |
| JP | A-2011-246031 | 12/2011 |

* cited by examiner

*Primary Examiner* — Mary McManmon
*Assistant Examiner* — Nicole Wentlandt
(74) *Attorney, Agent, or Firm* — Oliff PLC (57) ABSTRACT

A fuel tank structure comprising a fuel tank; a canister that adsorbs evaporated fuel within the fuel tank, and that releases vapor after adsorption of evaporated fuel; a full tank regulating valve within the fuel tank that becomes a closed state due to a float floating in fuel when a fuel liquid surface reaches a full tank liquid level that is set in advance; a communication pipe that communicates the fuel tank and the canister via the full tank regulating valve, a cross-sectional area varying valve that, when tank internal pressure that is applied from inside of the fuel tank increases, reduces a cross-sectional area of a flow path of vapor that flows toward the float; and a suppressing member that is positioned between the cross-sectional area varying valve and the float, and that suppresses airflow from the cross-sectional area varying valve from directly abutting the float.

4 Claims, 5 Drawing Sheets

FUEL TANK STRUCTURE

CROSS-REFERENCE TO RELATED APPLICATIONS

This application claims priority under 35 USC 119 from Japanese Patent Application No. 2013-030393 filed Feb. 19, 2013, the disclosure of which is incorporated by reference herein.

BACKGROUND OF THE INVENTION

1. Technical Field

The present invention relates to a fuel tank structure.

2. Related Art

Japanese Patent Application Laid-Open (JP-A) No. 2011-246031 discloses, as a fuel tank structure, a structure that is provided with a second valve mechanism beneath a float, and is provided with a fuel cut-off valve in which, when airflow that is headed toward the fuel cut-off valve is received from the fuel tank interior, a closing body reduces the opening surface area of an introduction port.

In the structure of JP-A No. 2011-246031, a connection hole is provided at the closing body in order to ensure ventilation even in the state in which the valve is closed. However, when a flow path to a canister that adsorbs evaporated fuel within the fuel tank is opened, or the like, there are cases in which the vapor that has passed through this connection hole acts on the float.

In such cases as well, it is desirable to make it such that the float does not close inadvertently.

SUMMARY

In consideration of the above-described circumstances, a subject of the present invention is to provide a fuel tank structure that, in a state in which an interior pressure of a fuel tank is high, can suppress airflow from the fuel tank from acting on a full tank regulating valve and the full tank regulating valve closing.

A fuel tank structure of a first aspect of the present invention has: a fuel tank that can accommodate fuel at an interior; a canister that, by an adsorbent, adsorbs evaporated fuel within the fuel tank, and that releases, to the atmosphere, vapor after adsorption of evaporated fuel; a full tank regulating valve that is provided within the fuel tank, and that closes due to a float floating in fuel when a fuel liquid surface within the fuel tank reaches a full tank liquid level that is set in advance; a communication pipe that communicates the fuel tank and the canister via the full tank regulating valve, and at which is provided a sealing valve that can be opened and closed by control; a cross-sectional area varying valve that, when tank internal pressure that is applied from inside of the fuel tank increases, reduces a cross-sectional area of a flow path of vapor that flows toward the float; and a suppressing member that is positioned between the cross-sectional area varying valve and the float, and that suppresses direct abutment of airflow from the cross-sectional area varying valve to the float.

In this fuel tank structure, in the state in which the sealing valve is open, the fuel tank and the canister are communicated by the communication pipe. Therefore, vapor, that contains evaporated fuel within the fuel tank, can be moved to the canister.

Further, at the time of supplying fuel to the fuel tank, when the fuel liquid surface reaches the full tank liquid level, the float floats in the fuel and the full tank regulating valve closes. Therefore, it is made such that the vapor within the fuel tank is not discharged to the exterior, and the supplied fuel can be made to reach the fueling gun from the inlet pipe and the like.

When the tank internal pressure that is applied from the interior of the fuel tank increases, the cross-sectional area varying valve decreases the cross-sectional area of the flow path of the vapor that flows toward the float. Accordingly, even if the sealing valve is opened in the state in which the tank internal pressure of the fuel tank is high, the flow rate of the vapor that flows from the fuel tank interior to the float decreases.

Moreover, the suppressing member is provided between the cross-sectional area varying valve and the float. The suppressing member suppresses direct abutment of the airflow from the cross-sectional area varying valve to the float. Accordingly, vapor within the fuel tank, that has passed-through the flow path, can be suppressed from hitting the float directly such that the float is moved in the valve closing direction.

Due to the above, even in a state in which the tank internal pressure of the fuel tank is high, the float moving toward the valve closing side is suppressed, and closing of the full tank regulating valve is suppressed.

In a fuel tank structure of a second aspect of the present invention, in the first aspect, the cross-sectional area varying valve has: a partitioning wall that partitions the flow path of the vapor at an upstream side of the flow path than the suppressing member, and an opening portion is formed in the partitioning wall; and a cross-sectional area varying valve main body that is provided further toward the upstream side of the vapor flow path than the partitioning wall, and the cross-sectional area varying valve main body can, due to an increase in the tank internal pressure, move from a separated state of being separated from the partitioning wall to a contacting state of contacting the partitioning wall, and the cross-sectional area varying valve main body opens the opening portion in the separated state, and partially closes the opening portion in the contacting state.

Accordingly, in the separated state of the cross-sectional area varying valve main body, the opening portion is opened, and the cross-sectional area of the flow path of vapor from the fuel tank interior toward the float can be ensured to be relatively large. In contrast, when the tank internal pressure increases and the cross-sectional area varying valve main body enters into the contacting state, the opening portion is partially closed, and therefore, the flow rate of the vapor that flows from the fuel tank interior to the float can be reduced reliably.

In a fuel tank structure of a third aspect of the present invention, in the first or second aspect, the suppressing member has: a barrier portion that is positioned between the cross-sectional area varying valve and the float; and a side wall portion that stands erect from the barrier portion and surrounds a periphery of the float.

Namely, because the barrier portion is positioned between the flow path of vapor and the float, the vapor, that is from the fuel tank and has passed-through the flow path, can be suppressed from directly hitting the float by the barrier portion.

Further, the side wall portion stands erect from the periphery of the barrier portion and surrounds the periphery of the float. Therefore, the vapor, that is from the fuel tank and has passed-through the flow path, can be suppressed from hitting the periphery of the float.

In a fuel tank structure of a fourth aspect of the present invention, in the third aspect, a flow-down hole is formed in the barrier portion and causes fuel above the barrier portion to flow downward.

Accordingly, the fuel that has accumulated above the barrier portion can be made to flow downward through the flow-down hole.

Because the present invention is structured as described above, in the state in which the tank internal pressure of the fuel tank is high, airflow from the fuel tank can be suppressed from acting on the full tank regulating valve such that the full tank regulating valve is closed.

DETAILED DESCRIPTION OF THE INVENTION

Figure 1:
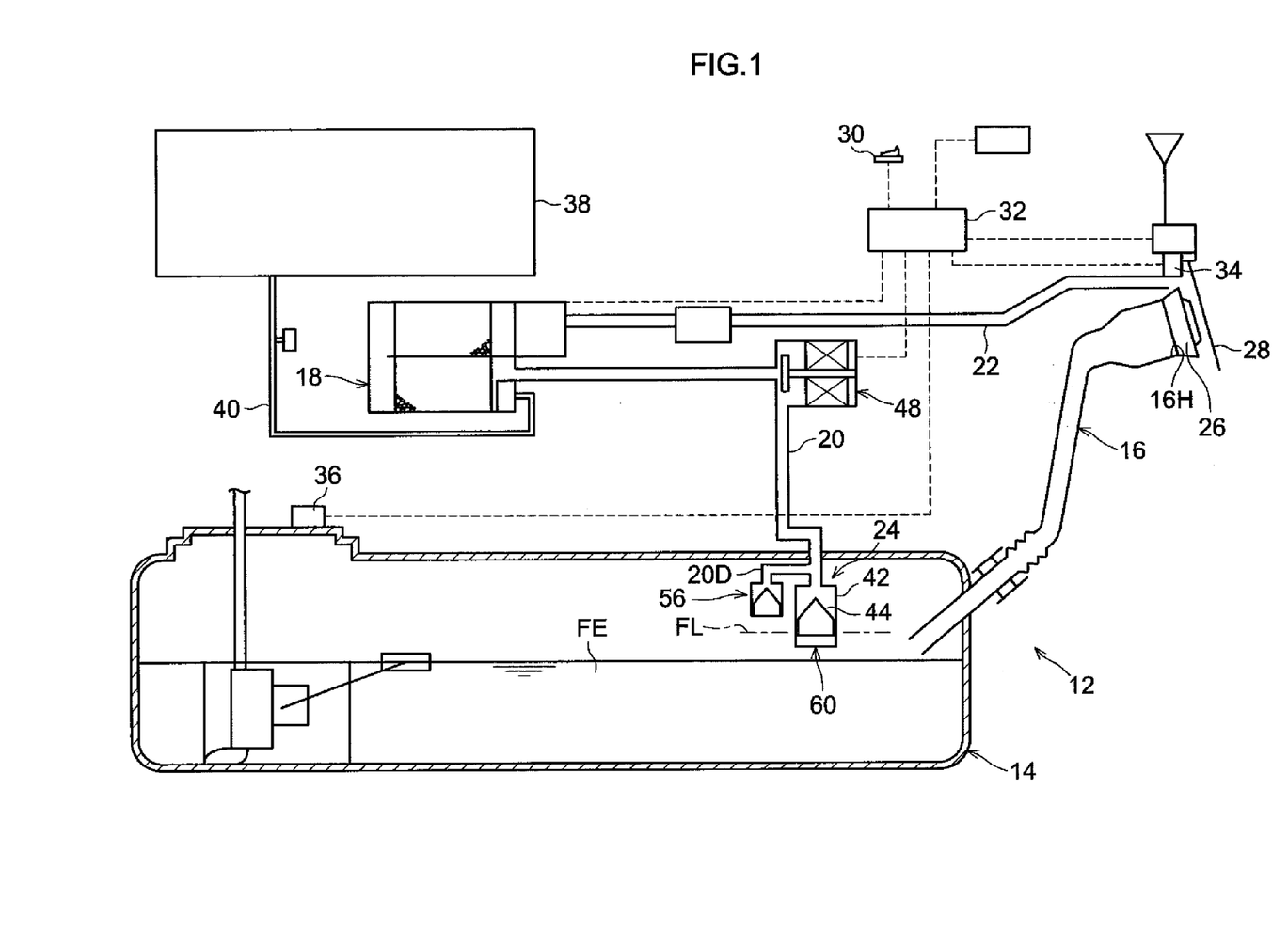
FIG. 1 is a schematic structural drawing showing a fuel tank structure of a first embodiment of the present invention.

A fuel tank structure 12 of a first embodiment of the present invention is shown in FIG. 1. Further, a full tank regulating valve 24, that structures the fuel tank structure 12, and the vicinity thereof are shown in a cross-sectional view in FIG. 2.

The fuel tank structure 12 has a fuel tank 14 that can accommodate fuel at the interior thereof. The lower end portion of an inlet pipe 16 is connected to the upper portion of the fuel tank. The opening portion at the upper end of the inlet pipe 16 is a fueling port 16H. A fueling gun is inserted into the fueling port 16H and fuel can be supplied to the fuel tank 14. The fueling port 16H of the inlet pipe 16 is usually opened and closed by a fuel cap 26. At times of fueling, the fuel cap 26 is removed by the fueling operator or the like.

A fuel lid 28 is provided at the outer side of the fuel cap 26 at a panel of the vehicle body. When a lid opening switch 30 provided within the vehicle cabin or the like is operated so as to open the fuel lid 28 and that information is sent to a control device 32, the control device 32 opens the fuel lid 28 under predetermined conditions that are described later. The opened/closed state of the fuel lid 28 is sensed by a lid opening/closing sensor 34, and the sensed information is sent to the control device 32.

A tank internal pressure sensor 36 is provided at the fuel tank 14. Information of the tank internal pressure that is sensed by the tank internal pressure sensor 36 is sent to the control device 32.

A canister 18 that accommodates an adsorbent such as activated carbon or the like is provided at the exterior of the fuel tank 14. The vapor layer at the interior of the fuel tank 14 and the canister 18 are connected by a communication pipe 20, and the vapor within the fuel tank 14 can be made to flow into the canister 18. The evaporated fuel within the vapor that has flown-in is adsorbed by the adsorbent of the canister 18. The vapor component (air component) that is not adsorbed is discharged into the atmosphere from an atmosphere communication pipe 22.

The canister 18 and an engine 38 are connected by a purge pipe 40. Due to negative pressure of the engine 38 being applied to the canister 18 in a state in which a sealing valve 48 that is described later is closed, air is introduced-in from the atmosphere communication pipe 22, and the evaporated fuel that has been adsorbed by the adsorbent can be desorbed (purged). The evaporated fuel that is desorbed is sent to the engine 38 and combusted.

The sealing valve 48 is provided midway along the communication pipe 20. In the present embodiment, the sealing valve 48 is an electromagnetic valve, and control of the opening and closing thereof is carried out by the control device 32. In the state in which the sealing valve 48 is open, vapor within the fuel tank 14 can move through the communication pipe 20 to the canister 18, and, in the state in which the sealing valve 48 is closed, movement of this vapor becomes impossible.

The full tank regulating valve 24 is provided at the lower end of the communication pipe 20 so as to be positioned at the upper portion of the interior of the fuel tank 14.

Figure 2:
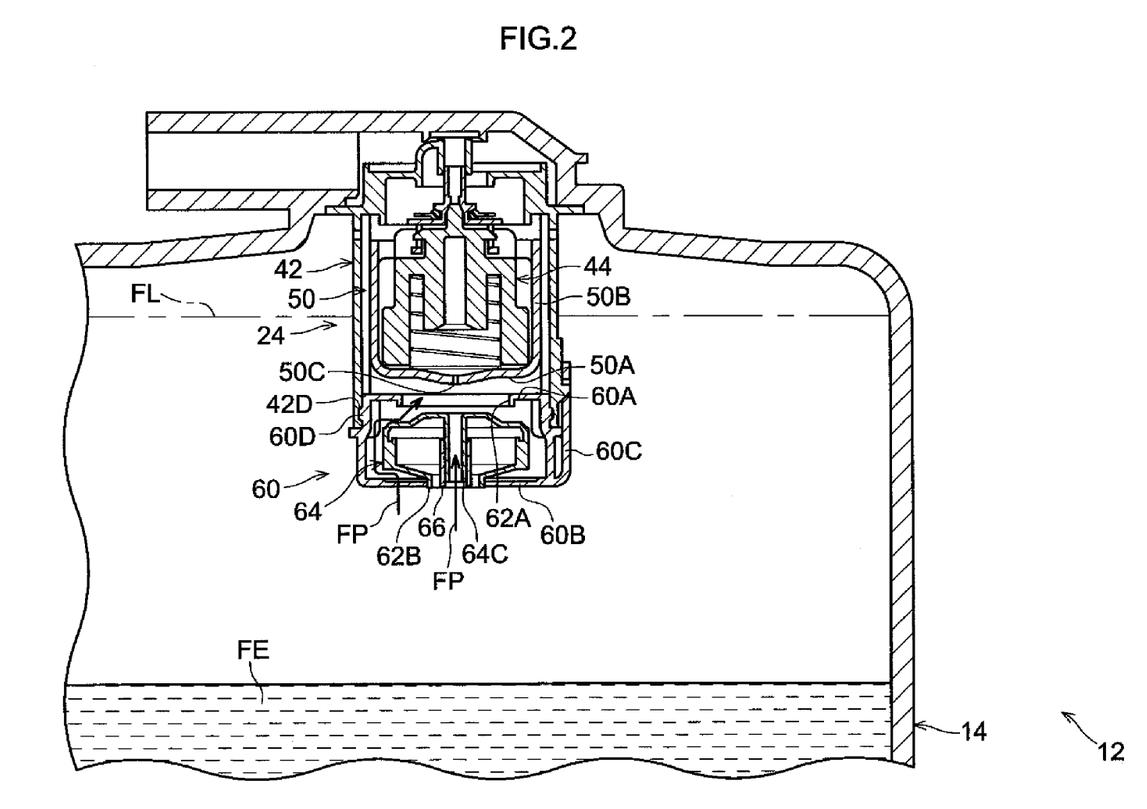
FIG. 2 is a cross-sectional view showing, in an enlarged manner, a full tank regulating valve of the fuel tank structure of the first embodiment of the present invention, and a vicinity thereof.
Figure 3:
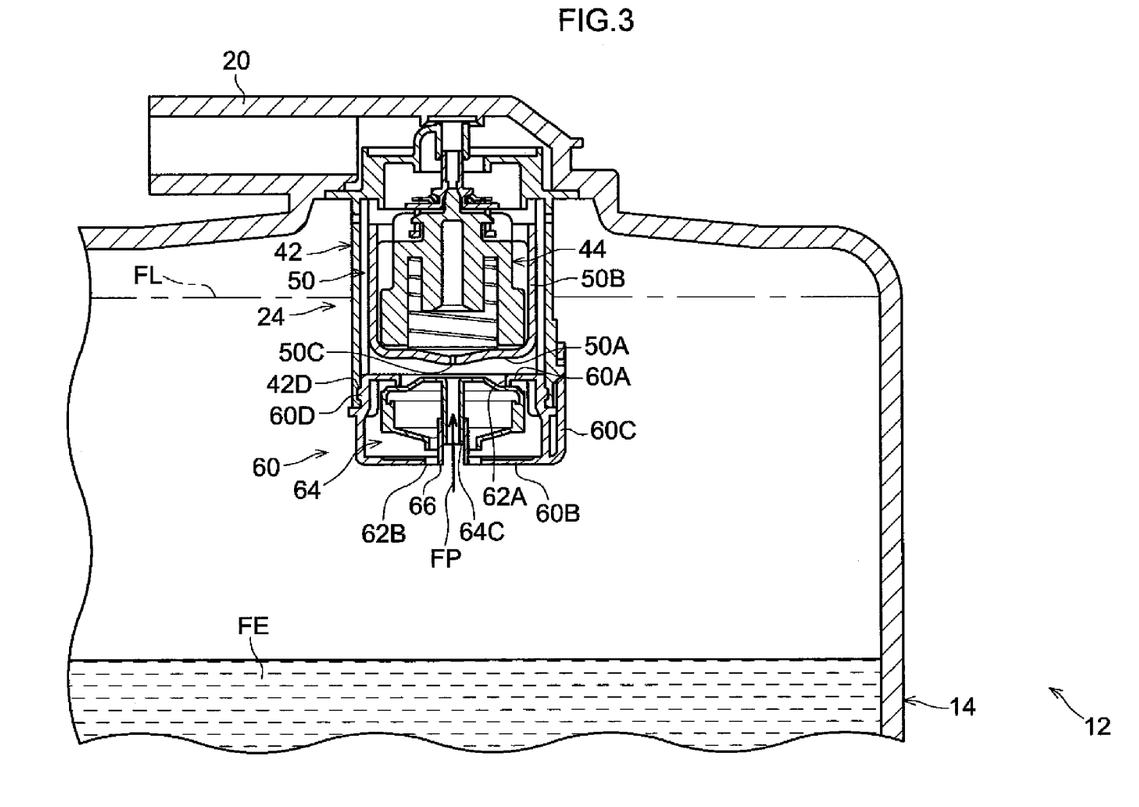
FIG. 3 is a cross-sectional view showing, in an enlarged manner, the full tank regulating valve of the fuel tank structure of the first embodiment of the present invention, and the vicinity thereof.

As shown in detail in FIG. 2 and FIG. 3, the full tank regulating valve 24 of the present embodiment has a valve housing 42 that substantially cylindrical tube shaped. A suppressing member 50, that is substantially cylindrical tube shaped and whose top surface is open, is provided within the valve housing 42.

As described later, the bottom portion of the suppressing member 50 is a barrier portion 50A that is substantially disc shaped and is positioned between a float 44 and a through passage 64C (a flow path FP of vapor) of a cross-sectional area varying valve 60. A side wall portion 50B that is cylindrical tube shaped stands erect from the periphery of this barrier portion 50A.

The side wall portion 50B surrounds the outer periphery of the float 44, and suppresses vapor from hitting the float 44 from the lateral direction.

An unillustrated communication hole is formed in the side wall portion 50B. As the liquid level within the fuel tank 14 rises, some fuel FE flows into the interior of the suppressing member 50 from this communication hole.

Further, the barrier portion 50A has a bottom surface of a shape that gradually falls toward the center (a substantial bowl shape), and a flow-down hole 50C is formed to pass-through the center of the barrier portion 50A. The fuel at the interior of the suppressing member 50 flows-down through the flow-down hole 50C, and is discharged to the exterior of (to beneath) the suppressing member 50.

The float 44 is disposed within the suppressing member 50. Until the liquid surface of the fuel FE within the fuel tank 14 reaches a full tank liquid level FL, there is a state in which there is no fuel within the suppressing member 50 as shown in FIG. 2 and FIG. 3. In this state, the float 44 is supported by the barrier portion 50A without floating in the fuel.

Figure 4:
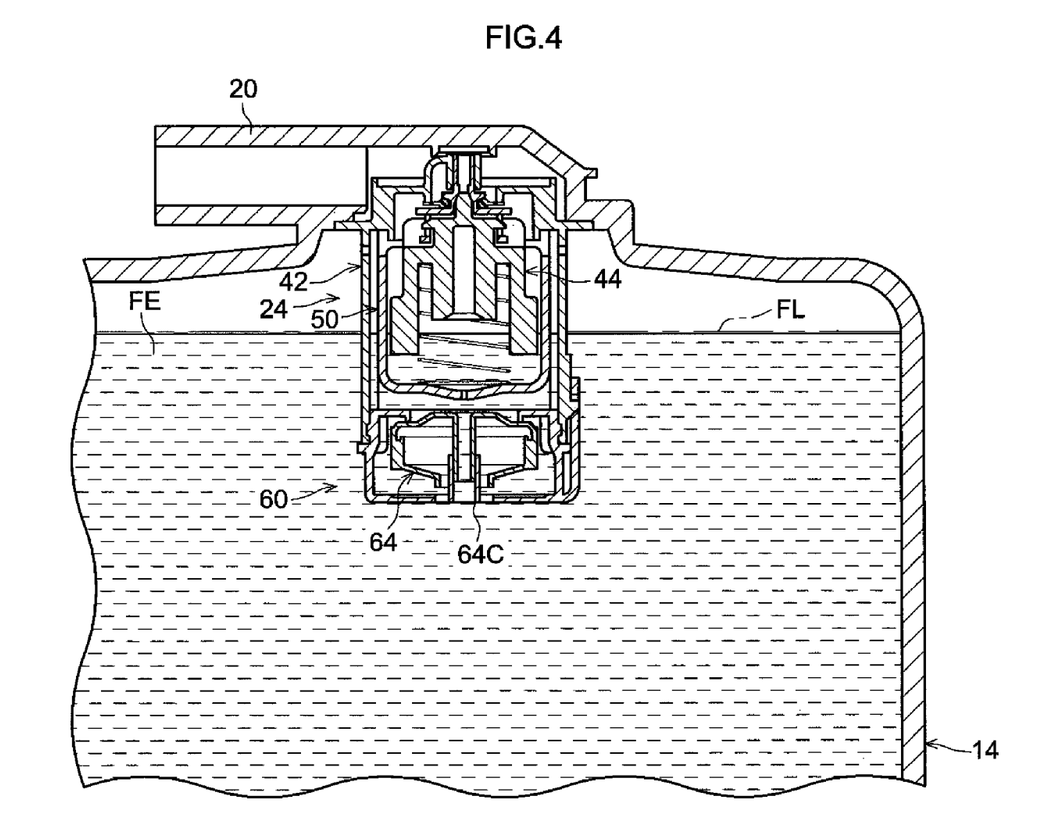
FIG. 4 is a cross-sectional view showing, in an enlarged manner, the full tank regulating valve of the fuel tank structure of the first embodiment of the present invention, and the vicinity thereof.

In contrast, when the fuel FE reaches the full tank liquid level FL, as shown in FIG. 4, the fuel FE flows into the suppressing member 50. Then, there becomes a state in which the float 44 floats in the fuel FE, and the full tank regulating valve 24 enters into a closed state. In this state in which the full tank regulating valve 24 is closed, the communication pipe 20 is closed by the float 44, and therefore, movement of vapor from the fuel tank 14 through the communication pipe 20 toward the canister 18 is impeded.

The cross-sectional area varying valve 60 is disposed beneath the full tank regulating valve 24. The cross-sectional area varying valve 60 has a tube portion 60C that is cylindrical tube shaped, a lower bottom portion 60B that is substantially disc shaped and forms a lower bottom of the tube portion 60C, and an upper bottom portion 60A that forms an upper bottom of the tube portion 60C.

The tube portion 60C is made to be a shape that is continuous with the valve housing 42 of the full tank regulating valve 24. The cross-sectional area varying valve 60 can be mounted to the full tank regulating valve 24 due to an anchor portion 60D, that is provided at the tube portion 60C, being anchored on an anchored portion 42D that is provided at the valve housing 42.

The upper bottom portion 60A is a partitioning wall and partitions the flow path of vapor at the upstream side (the lower side in FIG. 2 through FIG. 4) from the barrier portion 50A of the suppressing member 50. A through-hole 62A (opening portion) is formed in the upper bottom portion 60A. In the state in which the through-hole 62A is opened, movement of vapor from the upstream side toward the downstream side of the upper bottom portion 60A is possible.

A through-hole 62B is formed in the lower bottom portion 60B, and movement of vapor from the interior of the fuel tank 14 toward the interior of the cross-sectional area varying valve 60 is possible.

A cross-sectional area varying valve main body 64 is disposed within the tube portion 60C. The through passage 64C, that passes-through the cross-sectional area varying valve main body 64 in the vertical direction, is formed in the center of the cross-sectional area varying valve main body 64.

The tank internal pressure of the fuel tank 14 is applied upward to the cross-sectional area varying valve main body 64 (in the valve closing direction). In the state in which the tank internal pressure of the fuel tank 14 is a predetermined value that is lower than a tank sealing pressure, that is described later (refer to the graph shown in FIG. 5), as shown in FIG. 2, the cross-sectional area varying valve main body 64 does not move in the valve closing direction (the upward direction) and is supported by the lower bottom portion 60B. In this state (separated state), at the substantial flow path FP of the vapor, there is a path that goes from the through-hole 62B via the side of the tube portion 60C and the through-hole 62A and reaches the interior of the valve housing 42 of the full tank regulating valve 24, and a path that passes from the interior of the through passage 64C through the through-hole 62A.

In contrast, when the tank internal pressure of the fuel tank 14 exceeds the predetermined value (but is less than or equal to the tank sealing pressure), as shown in FIG. 3, the cross-sectional area varying valve main body 64 moves in the valve closing direction (the upward direction), and contacts the upper bottom portion 60A from beneath. In this state (contacting state), the through-hole 62A (opening portion) is partially blocked. Further, the substantial flow path FP of vapor is only the through passage 64C interior, and the cross-sectional area of the flow path FP becomes small.

A guiding tube 66 stands erect upwardly from the center of the lower bottom portion 60B. The through passage 64C of the cross-sectional area varying valve main body 64 is accommodated within the guiding tube 66. Clattering and offset of the cross-sectional area varying valve main body 64 in the lateral direction are suppressed at the time when the cross-sectional area varying valve main body 64 moves vertically.

As shown in FIG. 1, a vicinity of the lower end portion of the communicating pipe 20 within the fuel tank 14 is branched-off such that a branched-off pipe 20D is structured. A cut-off valve 56 is provided at the lower end of the branched-off pipe 20D. The cut-off valve 56 is provided within the fuel tank 14 at a position that is higher than the full tank regulating valve 24.

When the tank internal pressure of the fuel tank 14 rises and exceeds a predetermined value, the cut-off valve 56 is opened and vapor within the fuel tank 14 can flow into the canister 18. For example, even if the full tank regulating valve 24 is closed, by opening the cut-off valve 56, vapor within the fuel tank 14 can move to the canister 18. Due thereto, an excessive rise in the tank internal pressure of the fuel tank 14 is suppressed.

Operation of the fuel tank structure 12 of the present embodiment is described next.

At the fuel tank structure 12, by closing the sealing valve 48, the fuel tank 14 can be made to be airtight. By making the fuel tank 14 airtight, vapor that contains evaporated fuel does not move toward the canister 18, and therefore, the load of adsorbing evaporated fuel at the canister 18 can be lessened.

When supplying fuel to the fuel tank 14, the fueling operator first pushes the lid opening switch 30. At this time, the control device 32 sets the sealing valve 48 in an open state, and makes it possible for vapor within the fuel tank 14 to move to the canister 18. Then, in the state in which the tank internal pressure sensor 36 senses that the tank internal pressure of the fuel tank 14 has fallen to less than or equal to a predetermined value, the control device 32 opens the fuel lid 28. If the fuel lid 28 is opened, the fueling operator can remove the fuel cap 26 from the fueling port 16H and supply fuel.

Here, as a comparative example, a fuel tank structure that is not provided with the cross-sectional area varying valve 60 is considered. Note that other than the cross-sectional area varying valve 60, the comparative example has substantially same structure as the first embodiment.

In the fuel tank structure of the comparative example, when the sealing valve 48 is opened, if the tank internal pressure of the fuel tank is too high, a large amount of vapor is applied from the fuel tank to the full tank regulating valve. Therefore, there is the concern that the float will be pushed by this vapor and move in the valve closing direction (the upward direction) and the full tank regulating valve will be closed. If the full tank regulating valve is closed, the tank internal pressure within the fuel tank cannot be decreased, and therefore, the lid is not opened by the control device and fueling is not possible.

Figure 5:
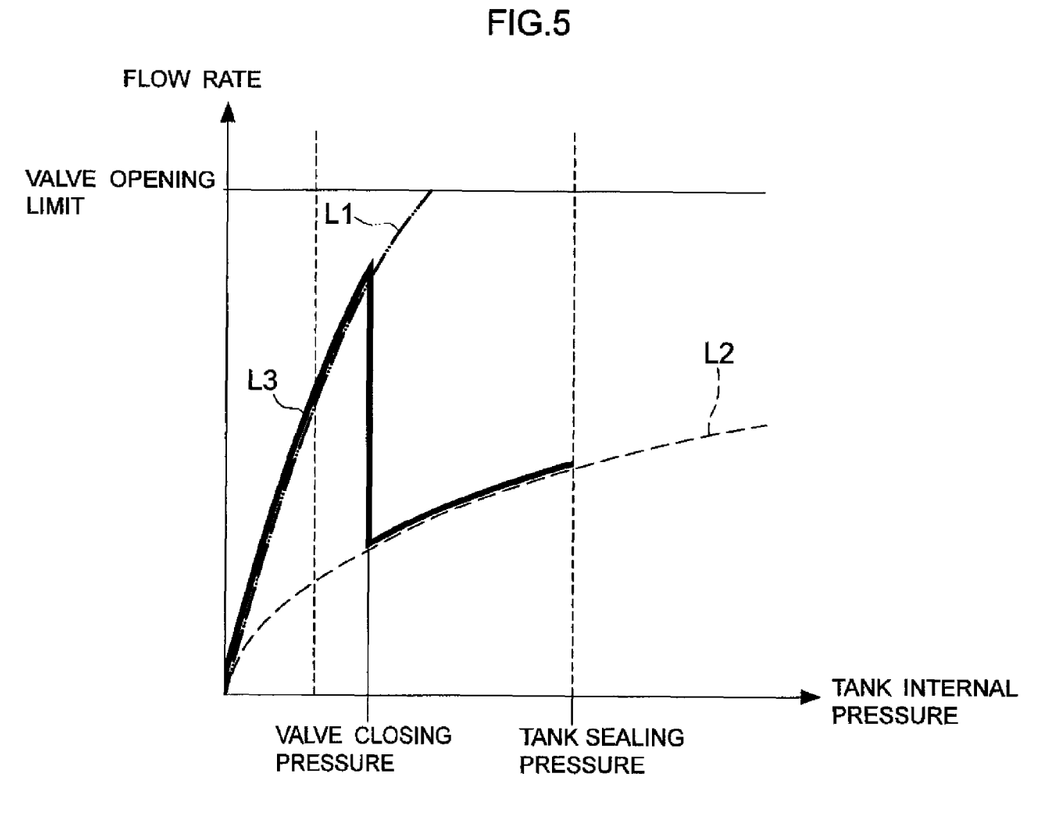
FIG. 5 is a graph that qualitatively shows the relationship between tank internal pressure and flow rate in the first embodiment of the present invention.

The relationship between the tank internal pressure of the fuel tank 14, and the flow rate of the vapor that flows from the fuel tank 14 through the communication pipe 20 toward the canister 18 (the amount that flows per unit time), is shown qualitatively in FIG. 5. In this graph, two-dot chain line L1 shows a time when the cross-sectional area varying valve 60 is in an open state, and dashed line L2 shows a time when the cross-sectional area varying valve 60 is in a closed state. In the present embodiment, the cross-sectional area varying valve 60 is in an open state until the tank internal pressure reaches valve closing pressure TP, and, when the tank internal pressure exceeds the valve closing pressure TP, the cross-sectional area varying valve 60 enters into a closed state. Accordingly, the relationship between the tank internal pressure and flow rate shows behaviors that differ at either side of the valve closing pressure TP, as shown by solid line L3 in FIG. 5. In contrast, because the structure of the comparative example does not have the cross-sectional area varying valve 60, the tank internal pressure and flow rate are the relationship shown by the two-dot chain line L1 (or a relationship that is close to this).

Note that, in this graph, "tank sealing pressure" is a threshold value of the tank internal pressure at which the sealing valve 48 is closed and the fuel tank 14 is maintained in the airtight state. When the tank internal pressure that is sensed by the tank internal pressure sensor 36 is less than or equal to this tank sealing pressure, the control device 32 maintains the sealing valve 48 in a closed state, but when the tank internal pressure exceeds the tank sealing pressure, the control device 32 opens the sealing valve 48. Further, the "valve opening limit" in the graph is a flow rate such that, when the flow rate of vapor that flows through the communication pipe 20 is less than or equal to this valve opening limit, the full tank regulating valve 24 is opened, but, at flow rates that exceed the valve opening limit, there is the concern that the full tank regulating valve 24 will be closed.

As can be understood from this graph, when the tank internal pressure becomes high, the flow rate of vapor is also large. In the fuel tank structure of the comparative example, the amount of the vapor flow rate that accompanies a rise in the tank internal pressure rapidly increases largely. In particular, in the example shown in this graph, the vapor flow rate reaches the valve opening limit before the tank internal pressure reaches the tank sealing pressure. Further, due to the flow rate reaching the valve opening limit, the difference in pressures above and below the float 44 also becomes large, and there is the concern that the full tank regulating valve 24 will close.

In the fuel tank structure 12 of the present embodiment, when the tank internal pressure of the fuel tank 14 is less than or equal to the valve closing pressure TP shown in FIG. 5, the cross-sectional area varying valve main body 64 does not move in the valve closing direction (the upward direction). Accordingly, the vapor flow rate does not exceed the valve opening limit of the full tank regulating valve 24, and therefore, the full tank regulating valve 24 is not closed, and the vapor within the fuel tank 14 passes through the communication pipe 20 and moves toward the canister 18.

Thereafter, when the tank internal pressure exceeds the valve closing pressure TP, the cross-sectional area varying valve main body 64 moves in the valve closing direction (the upward direction), and the substantial flow path of the vapor becomes the through passage 64C. Because the cross-sectional area of the flow path of the vapor becomes smaller, even if the tank internal pressure is high, the vapor flow rate is low as compared with the fuel tank structure of the comparative example. By suppressing the flow rate in this way, closing of the full tank regulating valve 24 is suppressed more than in the fuel tank structure of the comparative example.

Moreover, in the present embodiment, the vapor, which heads from the fuel tank 14 through the through passage 64C toward the float 44 of the full tank regulating valve 24, hits the barrier portion 50A of the suppressing member 50, and therefore, this vapor directly hitting the float 44 is suppressed. Accordingly, the float 44 being pushed-up in the valve closing direction (the upward direction) by the vapor that has flowed through the through passage 64C is suppressed.

Due to closing of the full tank regulating valve 24 being suppressed in this way, vapor in the fuel tank 14 flows through the communication pipe 20 to the canister 18, and the tank internal pressure of the fuel tank 14 falls. Then, when the tank internal pressure becomes less than or equal to a predetermined value, the control device 32 opens the fuel lid 28, and therefore, the fueling operator can remove the fuel cap 26 and supply fuel to the fuel tank 14.

Note that, in the present embodiment, the suppressing member 50 has not only the barrier portion 50A, but also the side wall portion 50B that is positioned at the side of the float 44. Accordingly, offset of the float 44 in the lateral direction at the time when the float 44 moves vertically is suppressed. In particular, the vapor that has passed through the through passage 64C is suppressed from circling around from the lateral direction and hitting the float 44 such that the float 44 inadvertently moves in the lateral direction.

Even at times other than during fueling as described above, if the tank internal pressure exceeds the tank sealing pressure, it is often the case that the control device 32 is controlled to open the sealing valve 48 (to carry out "pressure releasing") in order to suppress an excessive rise in the tank internal pressure. In the fuel tank structure of the comparative example, when the sealing valve 48 is opened in the state in which the tank internal pressure exceeds the tank sealing pressure, the vapor flow rate exceeds the valve opening limit, and therefore, there is the concern that the full tank regulating valve 24 will be closed. In contrast, in the fuel tank structure 12 of the first embodiment, even if the tank internal pressure reaches the tank sealing pressure, the vapor flow rate does not reach the valve opening limit. Further, the float 44 being pushed-up in the valve closing direction (the upward direction) by the vapor that has flowed through the through passage 64C is suppressed. For these reasons, closing of the full tank regulating valve 24 is suppressed, and therefore, vapor within the fuel tank 14 can flow from the communicate pipe 20 to the canister 18 and the pressure of the fuel tank 14 interior can be reduced.

It is preferable that the opening surface area of the through passage 64C be made to be small, if it is merely in order to limit the vapor flow rate in the state in which the tank internal pressure is high. However, if the opening surface area is made to be too small, the flow rate of the vapor that moves from the fuel tank 14 to the canister 18 becomes too small, and therefore, in the state in which the full tank regulating valve 24 is open, a long time is needed for reducing the tank internal pressure and for fueling. Accordingly, it is preferable to, while satisfying the condition that the full tank regulating valve 24 is not closed at the time when the sealing valve 48 is open, determine the opening surface area of the through passage 64C such that the flow rate of the communication pipe 20 can be sufficiently ensured at times of reducing the tank internal pressure and at times of fueling.

What is claimed is:

1. A fuel tank structure comprising:
   a fuel tank that can accommodate fuel at an interior;
   a canister comprising an adsorbent, the canister adsorbing evaporated fuel within the fuel tank, and releasing, to the atmosphere, vapor after adsorption of evaporated fuel;
   a full tank regulating valve that is provided within the fuel tank, and that becomes a closed state due to a float floating in fuel when a fuel liquid surface within the fuel tank reaches a full tank liquid level that is set in advance;
   a communication pipe that communicates with the fuel tank and the canister via the full tank regulating valve, and at which is provided a sealing valve that can be opened and closed by control;

a cross-sectional area varying valve that, when tank internal pressure that is applied from inside of the fuel tank increases, reduces a cross-sectional area of a flow path of vapor that flows toward the float; and a suppressing member that is positioned between the cross-sectional area varying valve and the float, and that suppresses airflow from the cross-sectional area varying valve from directly abutting the float, wherein:

the cross-sectional area varying valve has an upper bottom portion, a tube portion, a main body, and a lower bottom portion that supports the main body from a lower side, a through-hole is formed in the lower bottom portion, and a through passage, that passes through the main body in the vertical direction, is formed in a substantially center portion, along a horizontal direction of the main body, of the main body.

2. The fuel tank structure of claim 1, wherein:

the upper bottom portion partitions the flow path of the vapor at an upstream side of the flow path from the suppressing member, and in which an opening portion is formed; and the main body of the cross-sectional area varying valve is provided further toward the upstream side of the flow path than the partitioning wall; and wherein the main body of the cross-sectional area varying valve can, due to an increase in the tank internal pressure, move from a separated state of being separated from the upper bottom portion to a contacting state of contacting the upper bottom portion, and opens the opening portion in the separated state, and partially closes the opening portion in the contacting state.

3. The fuel tank structure of claim 1, wherein the suppressing member comprises:

a barrier portion that is positioned between the cross-sectional area varying valve and the float; and a side wall portion that stands erect from the barrier portion and surrounds a periphery of the float.

4. The fuel tank structure of claim 3 comprising a flow-down hole that is formed in the barrier portion and causes fuel above the barrier portion to flow downward.

* * * * *